United States Patent

[11] 3,594,823

| [72] | Inventors | Carter C. Collins<br>Mill Valley;<br>Paul Bach-Y-Rita, Mill Valley; Gordon W.<br>Holmlund, Oakland, all of, Calif. |
|---|---|---|
| [21] | Appl. No. | 798,379 |
| [22] | Filed | Feb. 11, 1969 |
| [45] | Patented | July 27, 1971 |
| [73] | Assignee | Patent Management, Inc.<br>Bethesda, Md. |

[54] VISUAL SUBSTITUTION SYSTEM WITH RECEPTOR SCANNING MEANS
10 Claims, 9 Drawing Figs.

[52] U.S. Cl. .................................................. 3/1
[51] Int. Cl. .................................................. A61f 9/00
[50] Field of Search........................................... 3/1;
128/404, 418, 419—424, 379, 384; 340/407;
178/7.6, 7.7

[56] References Cited
UNITED STATES PATENTS

| 2,829,199 | 4/1958 | Baracket et al. .............. | 178/7.7 |
| 3,309,461 | 3/1967 | Deutsch ....................... | 178/7.7 X |
| 3,429,990 | 2/1969 | Hobrough .................... | 178/7.7 X |

FOREIGN PATENTS

| 743,764 | 10/1966 | Canada ........................ | 3/1 |

*Primary Examiner*—William E. Kamm
*Attorney*—Hall, Pollock and Vande Sande

ABSTRACT: A tactile image converter for blind subjects comprises a quasi-random digitally swept vidicon camera tube, and an orthogonal logical switching matrix to connect sequentially each element of the vidicon photocathode surface to the corresponding element of a polarized solenoid stimulator matrix in contact with the subject's skin. The matrix acts as a mechanical image projector to impress a two-dimensional, vibrating facsimile of the outlines of a visible object onto a large area of skin.

INVENTORS
C. C. Collins
P. Bach-y-Rita
G. Holmlund

BY Hall, Pollock & Vande Sande

ATTORNEYS

FIG. 3F.

VISUAL SUBSTITUTION SYSTEM WITH RECEPTOR SCANNING MEANS

BACKGROUND OF THE INVENTION

Blindness has always been one of the most difficult of all human afflictions to treat. Almost all therapeutic approaches to date have been designed to rehabilitate a blind person to a nonvisual world. Suggestions have been made in the past, however, that it may be possible to replace a lost sense of vision conveying signals to the brain in some alternative fashion.

In searching for an alternative modality to replace vision it has been found that the integument of a subject is the only organ besides the eye with receptors organized to receive stimuli to be interpreted and distributed in two dimensions of space, with temporal integrating capability. There is, therefore, a growing contention that the most direct approach to the replacement of lost visual function will be through the sense of touch.

There is a considerable body of literature concerned with the transmission of information through the tactile modality. It has been stated, for example, that a basic universality of neural coding mechanisms for pattern transmission and discrimination applies to tactile, auditory and visual acuity. Earlier workers in the field have found that tactile recognition of shapes compares favorably with that of the eye; and it has been determined that tracking a vibrating tactile target is as fast and accurate as that of the eye. The skin can detect movement across its surface faster than the finger can follow; and it has been hypothesized that this occurs since transmission time is less for tactile stimuli than for visual (the hand is indeed quicker than the eye). A number of groups have accordingly been working toward a tactile display of visual information. To the extent that these groups have reported results to date, however, the results have almost uniformly been limited by technical difficulties.

The present invention relates to a visual substitution system which overcomes many of the technical difficulties experienced by other workers heretofore and which has been found, after actual construction and testing, to achieve meaningful dynamic cutaneous displays permitting blind subject to achieve conceptual images of pictorial information and to develop spatial concepts that have previously been impossible, e.g., the determination of distance as a function of size change.

SUMMARY OF THE INVENTION

The system of the present invention uses an artificial receptor, e.g., a quasi-random digitally swept TV camera with which various types of optics can be used to produce the best image for a particular application, e.g., zoom, "fisheye," wide angle, telephoto, etc., to deliver an image to the skin of a subject by means of an array of tactile stimulators, or "vibrotactors." With training, the blind subject can interpret the tactile representation of the optical image picked up by the television camera, and thus essentially "sees" through the skin of his back. The image on the skin of the back sets up patterns of nerve pulses in the cutaneous nerves which arrive at the brain as coded pulse patterns carrying optical information. The brain then decodes this information based on experience acquired in training. Thus, a healthy, intact sensory modality (cutaneous sensation) becomes the means for carrying "visual" information from the artificial receptor (television camera).

The tactile stimulators comprise an array of vibrotactors each of which comprises a solenoid driving a core connected to a small, (e.g., 1 mm) vibrating tip. A total of 400 such vibrotactors may be provided in the array in a 20 by 20 matrix, or in four 10 by 10 matrices. The stimulator array may be disposed in an appropriate portable back pack or, if the weight of the overall array makes it inappropriate for a particular subject to carry such a back pack, the said array may be mounted in the back of a stationary chair or a wheel chair. In any event, the stimulator tips in the array are spaced from one another by approximately 10 millimeters whereby a 400 point array operates to cover an area on the back of the subject approximately 10 inches square. The vibratory array itself does not constitute the present invention, and various vibratory arrangements positionally disposed and operating in the fashion described herein may be employed.

The artificial receptor or television camera is mounted in front of the subject on a special support or, if the camera is sufficiently light in weight, can be carried on the head of the subject in the fashion of a miner's lamp. The camera functions to detect visible objects and, through the use of a quasi-random digital sweep, signals related to the visible object being detected are sampled and then transferred via an orthogonal logical switching matrix which functions to sequentially connect appropriately selected elements of the camera photocathode surface to the corresponding element of the solenoid stimulator matrix.

The overall system operates as an electromechanical image converter, and functions to impress a two-dimensional vibrating facsimile of the visible object onto a large area of the subject's skin. To help distinguish objects in difficult background situations, various forms of signal conditioning are made available, including edge enhancement and black-white reversal. In effect, the system acts as a tactile television system; and with the 20-line (or 400 point) system disclosed operates to present images with about one-tenth the resolution of the human fovea. Tactile communication bandwidth is limited by the spatial resolving power of the skin, but it has been found that experienced subjects can resolve stimulator tips spaced 10 mm. on the back. The "flicker-fusion" frequency of the skin is fivefold that of the eye; and consequently the input capacity of the skin of the trunk is in the order of 2 MHz., or comparable to that of the foveas. After a period of training, a subject can recognize a surprising number of salient features by use of the system to be described.

In effect, therefore, the present invention constitutes an improved arrangement for converting optical image into effective vibrating mechanical replicas, and for using vibrating patterns to stimulate the skin at all points of a two-dimensional projected image. The patterned stimulation can be recognized and interpreted by a subject's central nervous system as pictorial information.

BRIEF DESCRIPTION OF THE DRAWINGS

FIGS. 3A through 3F inclusive, taken together, constitute a circuit diagram of a visual substitution system constructed in accordance with the present invention; and FIG. 4 is a block diagrammatic legend illustrating the manner in which FIGS. 3A through 3F are interconnected.

DESCRIPTION OF THE PREFERRED EMBODIMENTS

To project haptic images onto the skin, the present invention employs an electromechanical image converter which takes its input from a television camera. With this system, visible objects are transduced into a mechanical image by a two-dimensional matrix of vibrating stimulators or vibrotactors in contact with the skin. The subject feels a picture impressed on his skin by many oscillating styli. By appropriate signal conditioning, only those styli representing the edges or outline of the visible picture may be activated. The stem utilizes a quasi-random digitally swept vidicon camera tube provided with appropriate optics, e.g., an adjustable zoom lens; and the quasi-random sweep pattern (shown for example in FIG. 2) allows differentiation of the video signal to provide edge-enhanced or outlined displays.

Binary stimulation is employed. Shades of gray are not presented as variations of intensity of the tactile stimulus. The all-or-none stimulation is achieved by electronically selecting a threshold illumination level above which the vibrotactors are turned on, and below which they are turned off in the appropriate and corresponding areas of the projected tactile image. Noise modulation in the signal integrated over time produces the equivalent of a time duration modulated signal resulting in shades of gray being perceived. That is, in one frame of the scan a given vibrotactor in the array may be "on," and in a subsequent scan it may be "off" due to the different effects of ambient noise modulation adding to or subtracting randomly from the signal level; and, as a result, a "gray" image would be perceived at such a point over a composite number of frames.

Figure 1:
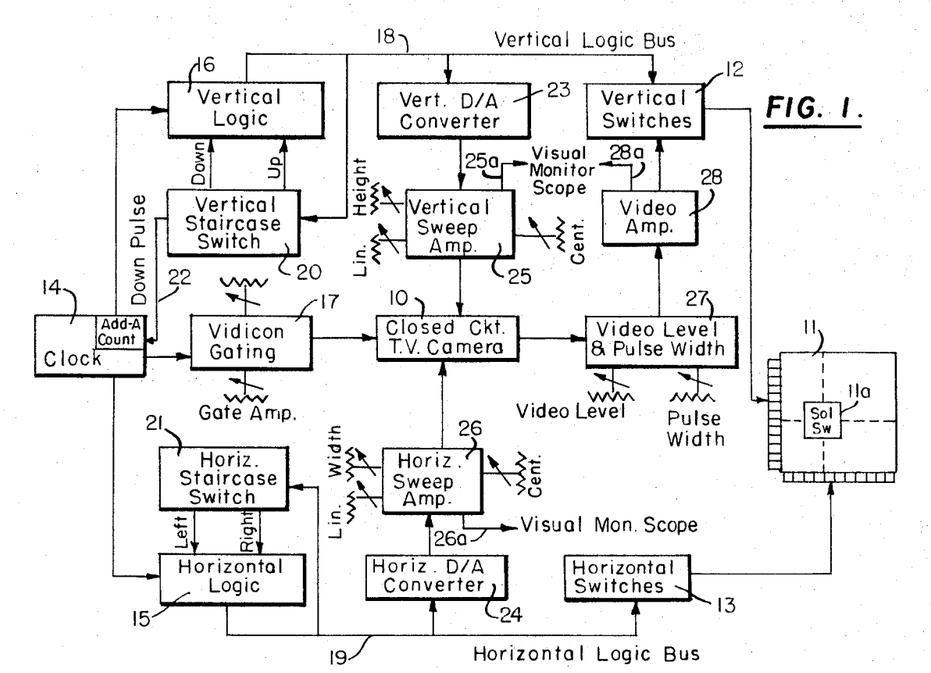
FIG. 1 is a block diagram of a visual substitution system constructed in accordance with the present invention.

Referring to FIG. 1, the overall system includes a closed circuit TV camera 10 which my take the form of a quasi-random digitally swept vidicon camera tube with appropriate optics. Signals taken from camera tube 10 ultimately control a solenoid operated vibrotactor matrix 11 constructed in the manner previously described. The individual vibrators in the matrix 11 are each selectively energized by a solenoid switch, such as 11a, which is in turn controlled by the joint action of a vertical switch 12 and a horizontal switch 13. Pluralities of said switches 12 and 13 drive two edges of the switching matrix 11 to sequentially connect each element of the vidicon photocathode surface in camera tube 10 to a corresponding vibratory element in the polarized solenoid vibrotactor matrix 11.

Camera tube 10 is swept at a rate of ten to twenty frames per second (depending on the frequency of clock 14, to be described). Because of the anticipated need for image signal conditioning, a quasi-random diagonal quadrature sweep is employed, in camera 10 and matrix 11, which approaches each point in the image from the four diagonal cardinal directions. This results in a sweep rate of 40 to 80 overlapping fields per second. The actual sweep pattern which is employed is per se known, and is diagrammatically represented in FIG. 2. To that effect, the sweep, assuming it to start at a point such as $a$ proceeds in the directions indicated by the several arrowheads to points $b, c, o$ $o, p, q, r$, etc.

As will become more apparent from subsequent description of FIG. 3, switch means are provided for controlling the mode of operation of stimulus presentation. Stimuli can be presented either as blocked-in representations of images or simply as outlines of these images. Moreover, as will also become apparent from FIG. 3, a phase inverter is provided to permit images to be reversed from black-on-white to white-on-black by selecting an appropriate switch position. In addition, the threshold level of illumination determining whether the tactile stimulus will be turned on or off can be continuously controlled throughout the entire range of illumination by means of an appropriate control knob.

The overall system is controlled and synchronized by a clock 14 comprising a free-running multivibrator having a nonsymmetrical square wave output, variable in frequency from 16 kHz. to 32 kHz. The output of clock 14 drives a horizontal logic circuit 15, a vertical logic circuit 16, and a vidicon gating circuit 17. Vertical and horizontal logic circuits 16 and 15 are made up of positive logic integrated circuits. They control the vidicon sweep and also control vertical switches 12 and horizontal switches 13 which select the appropriate solenoid switch 11a.

The clock pulses from clock 14 cause successive binary counts to be 150 to a vertical logic bus 18 and to a horizontal logic bus 19. The counts on vertical logic bus 18 are monitored by a vertical staircase switch 20 acting as an up-down count switching circuit which reverses the direction of the count output from vertical logic circuit 16 at the 0 and 21 logic levels. Similarly, the counts on horizontal logic bus 19 are monitored by a horizontal staircase switch 21 acting as a right-left switching circuit which reverses the direction of the count output from horizontal logic circuit 15 at the 0 and 21 logic levels. As a result, the vertical and horizontal logic circuits continually count from 0 up to 21 and then back to zero again. The down pulse from the vertical staircase switch 20 is differentiated and fed back at 22 to clock 14 to be mixed with the clock pulse output from clock 14. This mixing of one additional pulse into the horizontal logic during each sweep cycle operates to desynchronize the horizontal staircase sweep from the vertical sweep, so as to produce the sweep pattern already discussed in reference to FIG. 2.

The outputs of the vertical and horizontal logic buses 18 and 19 drive vertical and horizontal digital-to-analog converters 23 and 24 as well as the vertical and horizontal matrix switch circuits 12 and 13 already mentioned. Converters 23 and 24 produce a staircase voltage from the logic levels on buses 18 and 19 that is fed to vertical and horizontal sweep generators 25 and 26 respectively to control the scanning of the electron beam in vidicon 10. Generators 25 and 26 each include amplifiers which supply deflection power for the vidicon yoke coils. A separate cathode follower supplies the deflection voltage on lines 25a and 26a to operate an on line, quick-look visual monitor comprising, e.g., a cathode ray tube which may be incorporated into the equipment for purposes of experimentation or the like so that an experimenter can visually see what is being presented to the subject by the stimulator matrix. This monitor, if provided, may also be supplied with video information on line 28a from the output of a video amplifier 28 to be described.

Figure 2:
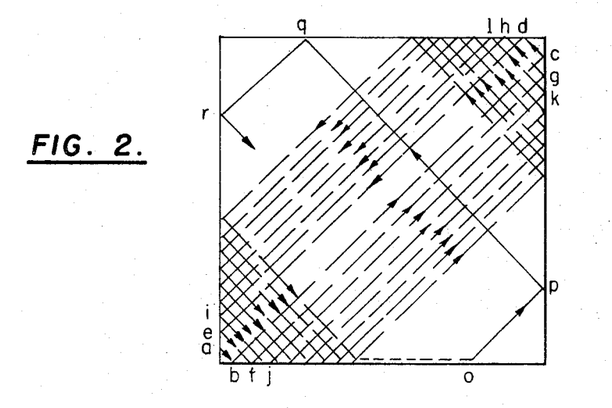
FIG. 2 is an illustrative diagram of the form of scanning sweep utilized in the system.

By the arrangement thus far discussed, the vidicon photocathode is scanned in accordance with FIG. 2 by step-by-step staircase deflection voltages. The vidicon exhibits a relatively slow response characteristic to a sweep of this type; and, as a result, vidicon gating circuit 17 is provided to sample the video signal at each point on the photocathode surface only after the scanning electron beam has come to rest in the proper position on the face of the photoconducting surface of the vidicon tube and the video signal has reached a steady state value. Appropriate delay of the gating signal for vidicon gate 17 is provided within the clock pulse generator circuit 14.

The sampled video signal is fed from tube 10 to a video level and pulse width circuit 27. At this point, means are provided for determining the threshold illumination level at which the tactile stimulators are actuated. In addition, circuit 27 operates to convert the analog video signal to a digital binary output with constant pulse width and amplitude. By means of a block or outline mode switch (to be described in reference to FIG. 3) these output pulses can either be sent directly to a video pulse amplifier 28, resulting in a normal block display, or can be conditioned through an outline or edge-only circuit resulting in outline presentation. The video pulse amplifier 28 supplies the power required to actuate vertical switches 12. A separate amplifier is preferable employed to supply sufficient voltage on line 28a for intensity modulation of the visual monitor.

The vertical and horizontal switches 12 and 13 are stepped in synchronism with the scanning electron beam of the vidicon camera tube 10. Power is supplied through a given vertical switch only when a video pulse is present. The output buses of the vertical and horizontal switches 12 and 13 constitute an orthogonal cross bar system. Logic steering diodes at the intersection of each orthogonal cross bar permit the appropriate vibrotactor switch to be actuated only when light is above a selective threshold level at the corresponding point in the visual image. The switch matrix 11 thus converts visual information into point-to-point tactile stimulation.

Electrical persistence is provided in the system having a value of 150 msec. Persistence is achieved by inclusion of a low pass filter at the input of each solenoid switch. This persistence is optional, and can be changed or removed if desired.

The supply voltage for the solenoid stimulators in matrix 11 is half-wave rectified 60 Hz. line voltage supplied through continuously adjustable transformers. These allow an experimenter or the subject to adjust the intensity of mechanical tactile stimulation. Two separate sources for solenoid voltage supply are employed, and each is connected to every other stimulator in the array. Adjacent stimulators are connected 180° out of phase in order to reduce inertial vibration of the array. This feature also permits reducing the definition of the display by a factor of two by turning off one of the solenoid supplies. This effectively increases the matrix spacing by a factor of two.

Figure 3A:
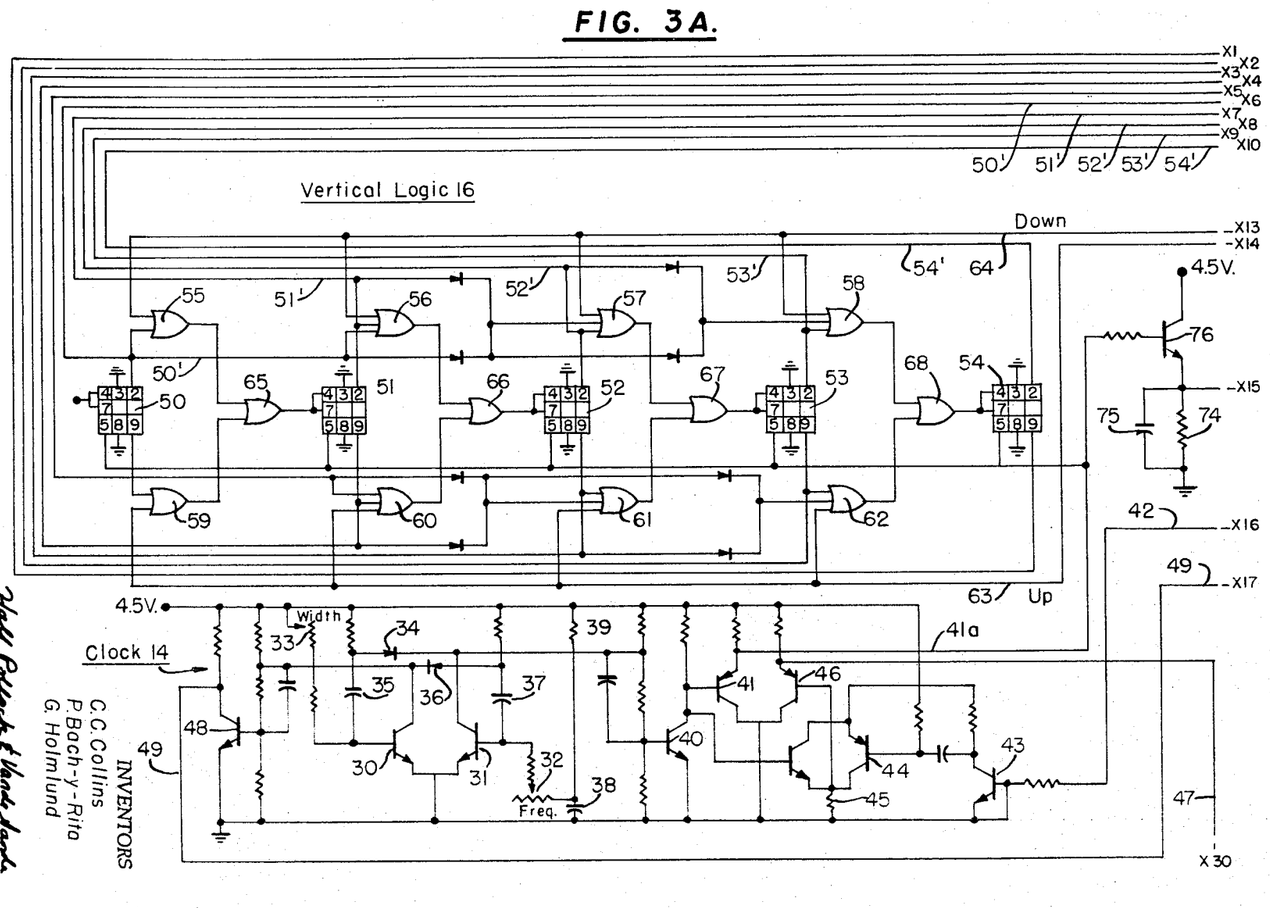
Figure 3B:
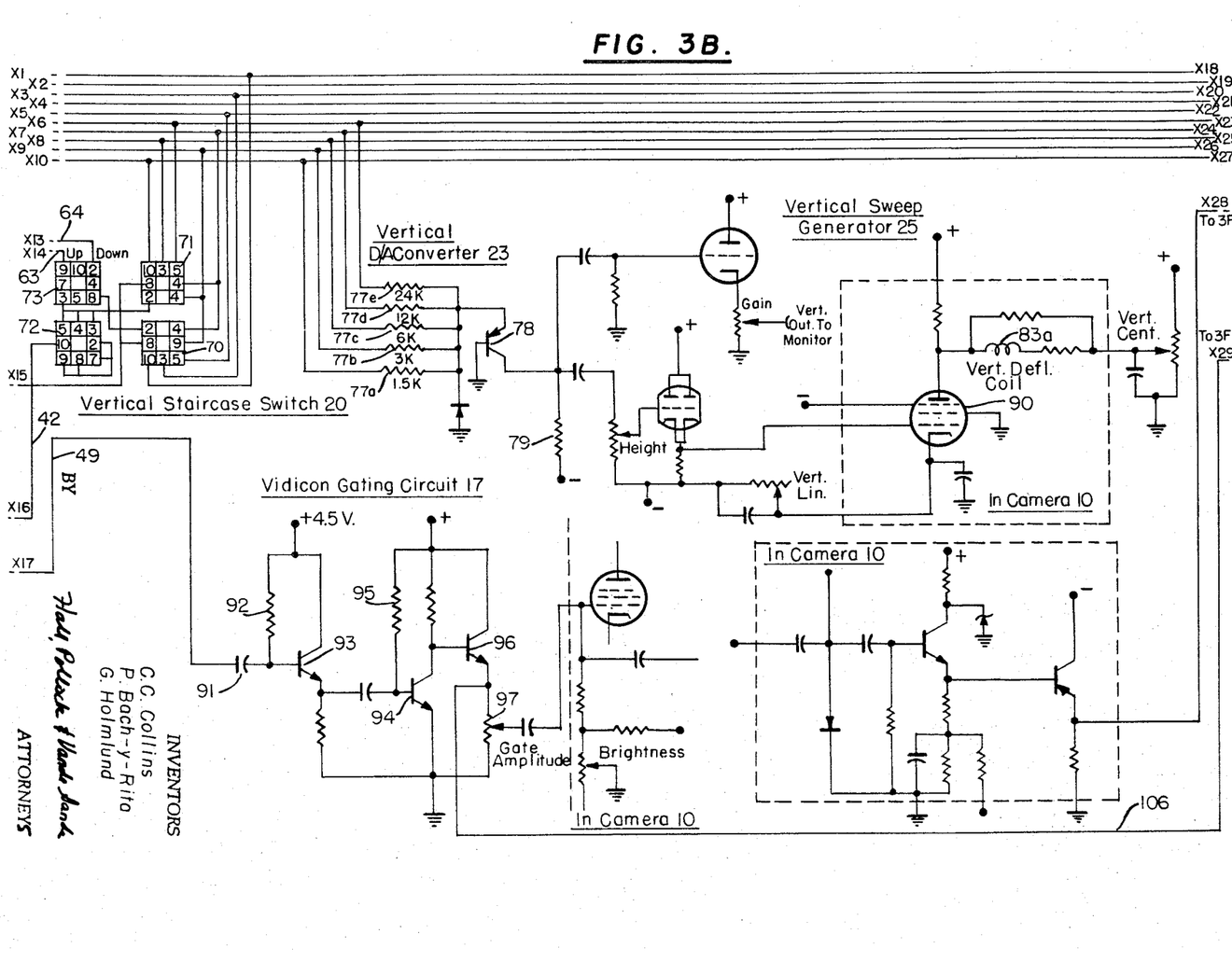
Figure 3C:
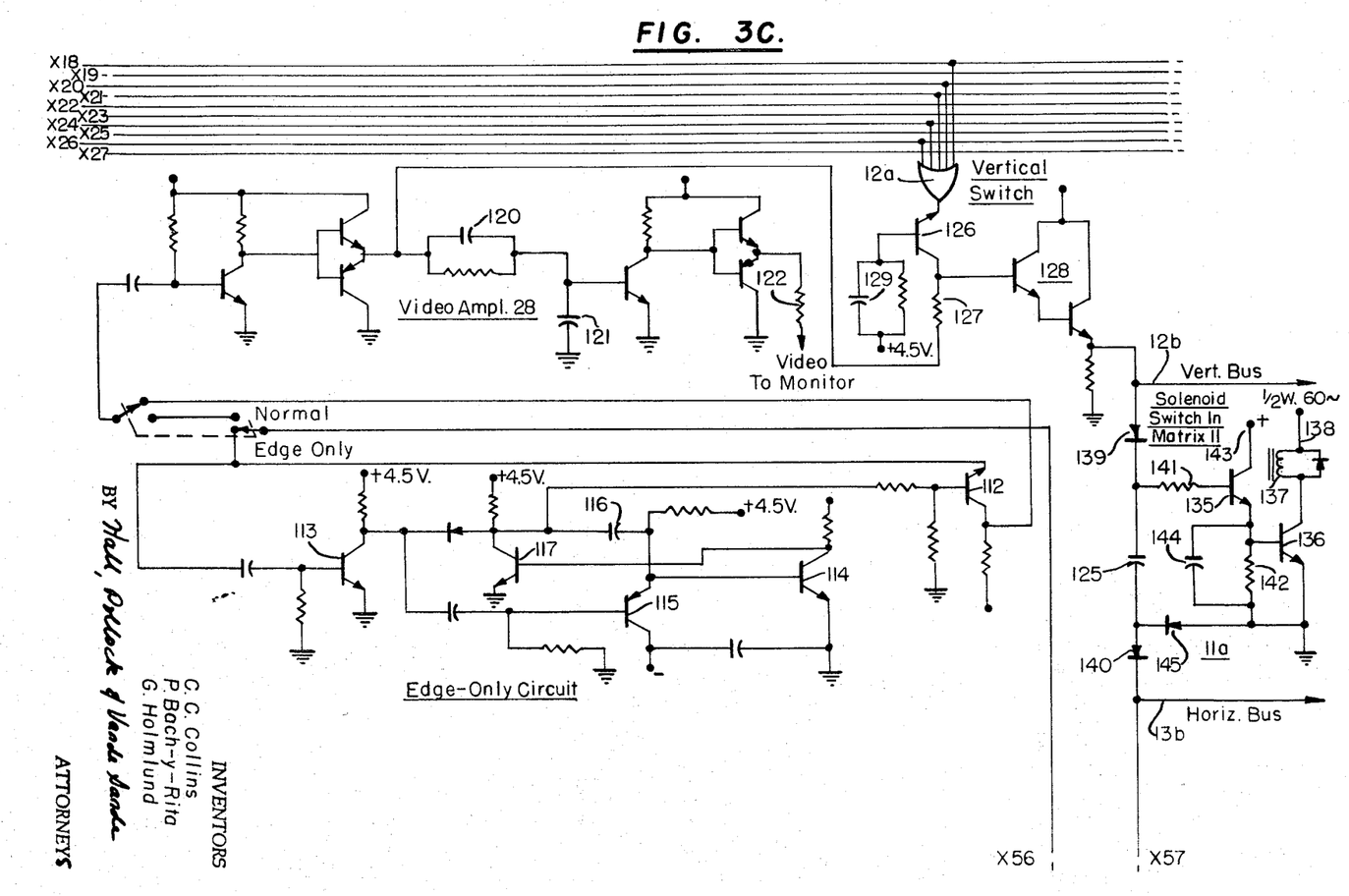
Figures 3D, 4:
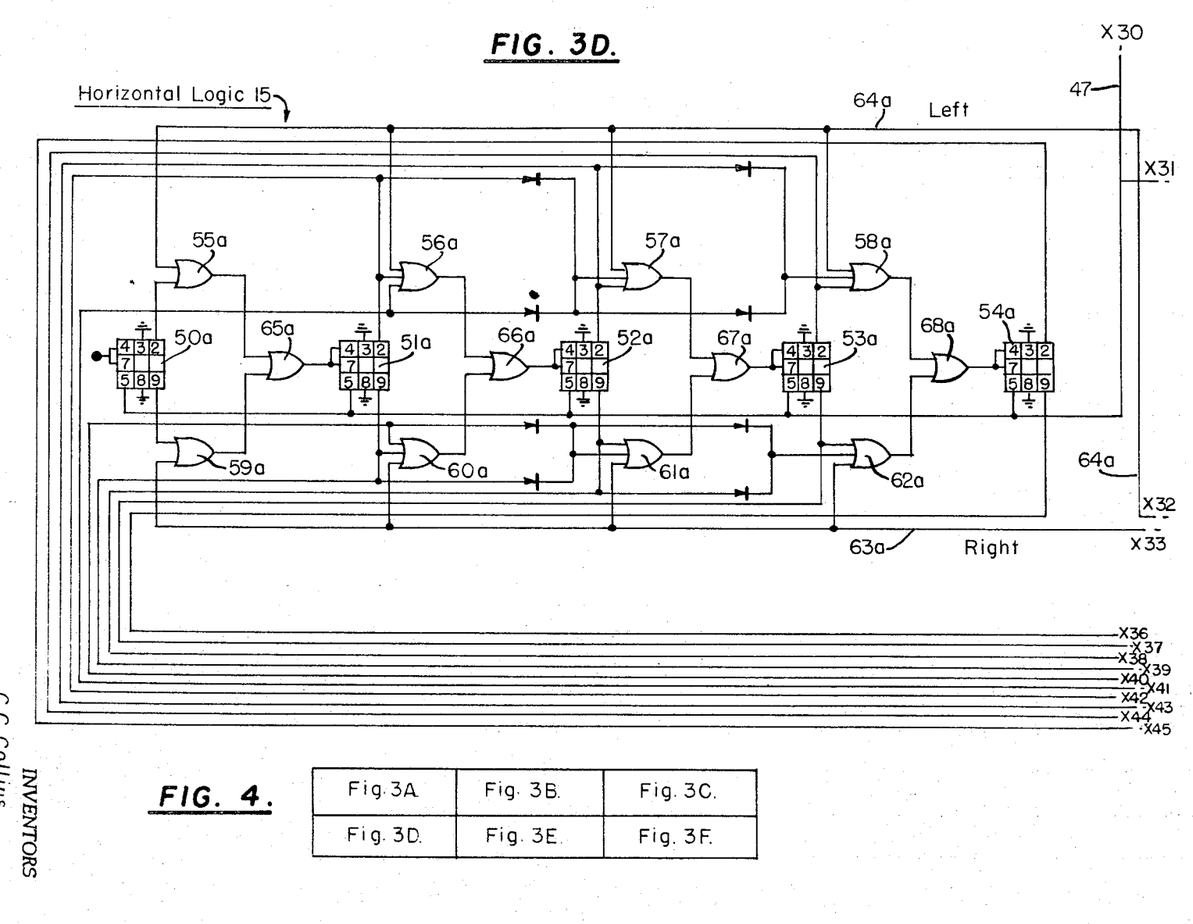

A detailed circuit constructed in accordance with the representation of FIG 1 is illustrated in FIGS. 3A through 3F inclusive, considered together in the fashion designated by the legend in FIG. 4. For convenience, various break points between the several figures have been designated $x_1$ through $x57$ inclusive to facilitate consideration of the several portions of the overall circuit as an entity. In addition, legends have been added to the several portions of the circuit identifying them by the same designations and numerals already referred to in FIG. 1.

The clock 14 is shown in FIG. 3A and comprises an astable multivibrator made up of a pair of 2N388 transistors 30 and 31. Both halves of the multivibrator cycle can be varied in duration, one part by a "clock frequency" potentiometer 32 and the other part of the cycle by means of a "pulse width" potentiometer 33. Elements 32 and 33 are so adjusted that one portion of the clock cycle is of much shorter time duration than the other. The long part of the clock cycle acts as a delay gate for the vidicon gating circuit 17, causing the vidicon to be gated late in the clock cycle so as to permit the vidicon sweep to position itself in the vidicon tube before the video is sampled by the gate.

A diode 34 prevents the recharging of timing capacitor 35 from affecting the output waveform; and a further diode 36 similarly prevents the recharging of timing capacitor 37 from affecting the other output waveform. A capacitor 38 and resistor 39 supply the frequency control and create an unbalance when the circuit is first energized so the multivibrator is sure to start. Transistor 40 provides a stage of isolation between the clock output and its loads. The output of transistor 40 is fed to an emitter follower comprising transistor 41 which supplies clock information on line 41a to the vertical binary logic. Since the type of logic used constitutes sink loads, PNP transistors were chosen to give a low impedance during "on" time.

The horizontal logic 15 requires the addition of a desynchronizing pulse which is obtained by mixing the "-down" pulse 22 of the vertical logic with the clock output. This is accomplished by taking the 0 logic level pulse from the vertical logic on a line 42, amplifying it with transistor 43, differentiating it, amplifying it again with transistor 44, and then mixing it in a common load resistor 45. This mixed pulse information is fed through an emitter follower 46 to line 47 and thence to the horizontal logic (FIG. 3D).

The vertical and horizontal logic circuits 16, 15 are shown in FIGS. 3A and 3D respectively, and are identical. Each circuit is an up-down counting circuit progressing from 0 to 21 and then counting back to 0 again. Each circuit includes 5 flip-flop integrated circuit logic elements 50—54 (in FIG. 3A) and 50a—54 (in FIG. 3D). These flip-flop units, as shown in the drawings, comprise type LU320K logic elements manufactured by Signetics Corp. of Sunnyvale, Calif., and the symbols used in the drawings for the elements 50—54 and 50a—54a correspond to the symbology employed by Signetics. Each symbol represents a monolithic integrated circuit, and the numerals which form a portion of each symbol designate the various basing pin numbers of the overall circuit as designated by Signetics. These flip-flops only change state when the AND gate portion, pins 4 and 7, are at the "1" level. If the AND gate portion is at the "1" level, the clock pulse at pin 5 will cause the flip-flop to change state. Pins 3 and 8 are at ground level and do not enter into the circuit operation.

Figure 3E:
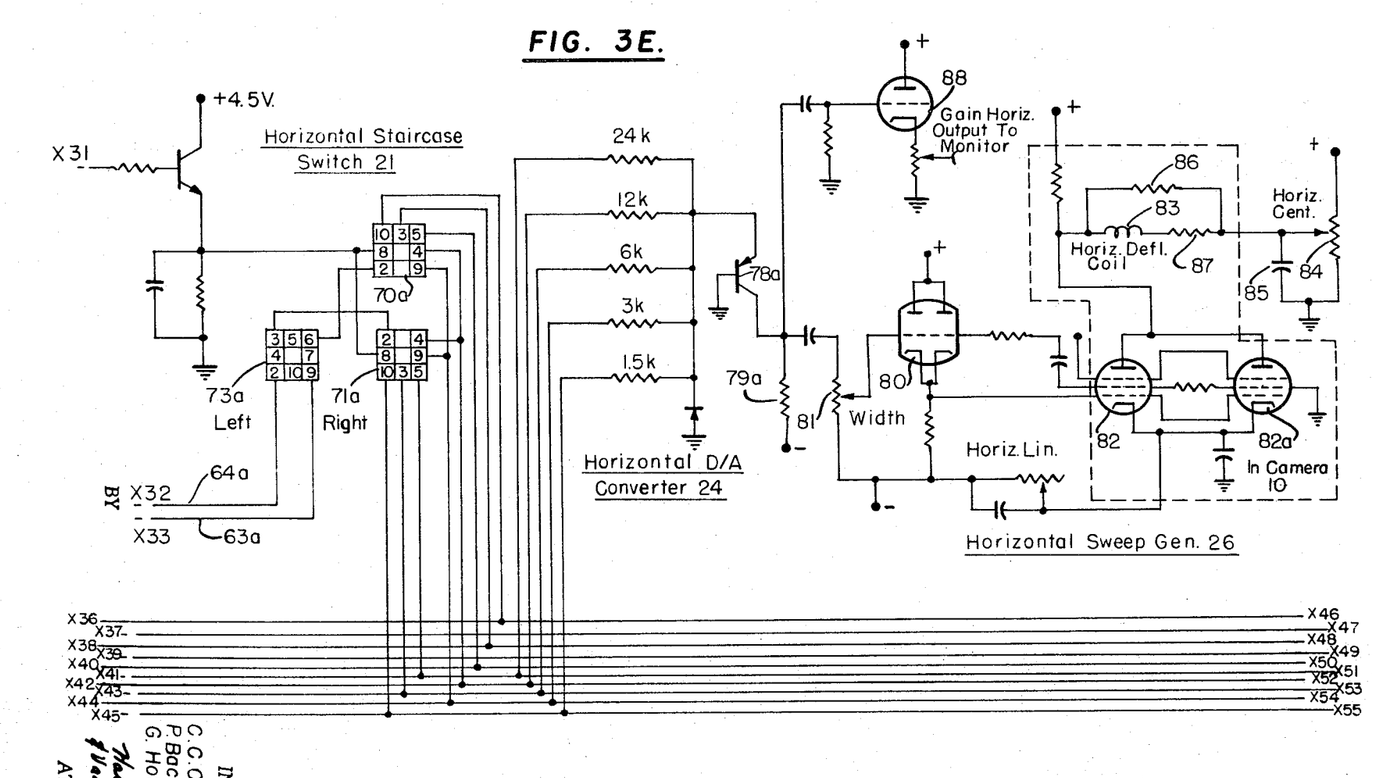

Groups of Signetics LU315K NOR gates 55—58 and 59—62 (in FIG. 3A) and 55a—58a, 59a—62a (in FIG 3D) are used to cause the count to go up or down depending on the input on the up and down lines 63, 64 (FIGS. 3A, 3B) or on the "right" and "left" 63a, 64a (FIGS. 3D and 3E). If any one of these lines is at the "1" level, the set of NOR gates coupled thereto is blocked, and the binary count is transferred through the other set of NOR gates. By way of example if line 63 (FIG. 3A) is at the "1" level, gates 59—62 are blocked, and the binary count is transferred through the set of gates 55—58, and vice versa. OR gates 65—68 (FIG. 3A) and 65a—68a (FIG. 3D) are used to couple the information from the unblocked NOR gates to the next flip-flop, thereby isolating the two sets of NOR gates in each logic circuit from one another. The "1" logic flip-flop AND gates are tied to a 4.5 volt source so that these flip-flops change states for each clock pulse.

To follow some of the logical sequence, and referring to FIG. 3A (it being understood that, by analogy, the same type of operation would occur in the circuit of FIG. 3D), let us assume that all flip-flops 50—54 are at the 0 state which is "0" at pin 2 and "1" at pin 9. The count line 64 is at "1" and count line 63 is at "0." The upper NOR gates 55—58 are accordingly held at "0" output. The coupling between the several flip-flops 50—54 must accordingly occur through the lower gates 59—62.

A first clock pulse will cause the first flip-flop 50 to change states. All other flip-flops will remain unchanged inasmuch as their "AND" gates are at "0" level. When flip-flop 50 has changed state, "0" logic from its pin 9 and "0" logic from count line 63 are passed through the NOR gate 59 and via OR gate 65 to pins 4 and 7 of flip-flop 51, setting it to operate on the next clock pulse. The second clock pulse causes flip-flop 50 to go to "0" and flip-flop 51 to go to "1." Again there is a "1" level fed to all NOR gates, so the next clock pulse will only affect flip-flop 50. The third clock pulse causes flip-flop 50 to go to the "1" state, which passes a "0" to NOR gate 59 and a "0" from both flip-flops 50 and 51 through NOR gate 60 to AND gate 66 of flip-flop 52. Flip-flops 50, 51, and 52 are now ready to change states with the next clock pulse. The next successive clock pulse then causes flip-flops 50 and 51 to go to the "0" state and flip-flop 52 to go to the "1" state.

By observing the states of the several NOR gates, the count can be followed until it reaches "21." At this time, the staircase switch (FIG 3B) changes the levels on count lines 63 and 64 so that their respective states are reversed. This blocks the lower set of NOR gates 59—62, and the logic will then be coupled to the upper set of NOR gates 55—58 which will cause the logic to count down. The several diodes shown in FIGS. 3A and 3D are used so that the logic can be paralleled through the NOR gates without cross feed, thus reducing the number of NOR gates required.

The vertical staircase switch 20 of FIG. 1 is shown in detail in FIG. 3B. It includes a pair of Signetics LU314K NOR gates 70 and 71, a Signetics LU315K NOR gate 72 and a flip-flop 73. Gate 70 puts out a pulse when the logic reaches the "21" level causing flip-flop 73 to change states. This causes the overall logic to count down in the manner already described. When the logic is counting down and reaches the 0 level, gate 71 puts out a pulse causing flip-flop 73 to again change states which starts the logic counting up again.

The pulse from gate 71 is also sent through gate 72 to line 42 to add a pulse to the horizontal logic so as to achieve desynchronization of the vertical and horizontal logic as already described. Gate 72 is required to provide a delay so that the added pulse can be discerned by the horizontal logic as a separate pulse. The several NOR gates are prevented from sampling the logic for approximately 5 microseconds by a time delay circuit comprising resistor 74 and capacitor 75 (FIG. 3A), giving the entire logic time enough to reach steady state before the sampling. An emitter follower 76 is added to supply current for the RC network 74, 75.

The horizontal staircase switch 21 of FIG. 1 is shown in detail in FIG. 3E; and the construction and operation of this switch corresponds essentially to that already described in reference to the vertical staircase switch 20 of FIG. 3B. However there is no need in the horizontal staircase switch 21 to make provision for adding a pulse to effect desynchronization of the horizontal and vertical scanning of the vidicon and stimulator matrix, this having already been accomplished by the circuits described previously. Elements 70a, 71a, and 73a in FIG. 3E correspond to elements 70, 71, and 73 of FIG. 3B.

The outputs from the various logic flip-flops 50—54 appearing on lines such as 50'—54' inclusive (FIG. 3A) correspond to levels 16, 8, 4, 2, and 1 respectively, and are fed through the vertical digital-to-analog converter 23 the details of which are shown in FIG. 3B. Each flip-flop output is coupled to one of resistors 77a—77e inclusive, said resistors having magnitudes which are weighted in accordance with the binary system. Thus, depending upon which of the various flip-flop lines are energized, different amounts of current are caused to be applied to the base of transistor 78 in accordance with the logic values of the input signals. Since each resistor 77a—77e is half the value of the next, twice the current will flow at each step thereby giving twice the output voltage across the collector load 79 of transistor 78 for each progressive logic level bus activation.

Similar considerations apply with respect to the structure and operation of the horizontal digital-to-analog converter 24, the details of which are shown in FIG. 3E.

The output of the horizontal digital to analog converter, appearing as a horizontal staircase voltage across load resistor 79a, is applied to a cathode follower 80 across a sweep width potentiometer 81 forming a portion of the horizontal sweep generator 26 (see FIG. 1). This input arrangement is employed to reduce the impedance to feed the cable to camera 10 (see FIG. 1). Cathode follower 80 comprises a pair of triodes connected in parallel as illustrated; and said parallel cathode follower negative feedback from the screen of a sweep driver 82 to improve linearity. The vidicon horizontal deflection coil 83 is in a DC bridge circuit consisting of the sweep drivers 82, 82a on one side, and the upper and lower portions of the horizontal centering control 84 on the other side. The setting of the horizontal centering control thus determines the idling current through coil 83, which positions the sweep. A capacitor 85 bypasses the centering control so that the signal is developed solely across the deflection network. Resistors 86 and 87 adjust the L/R time to accept the staircase sweep with reasonable linearity. Two sweep drivers 82, 82a are used in parallel to obtain sufficient drive voltage for the low impedance of the horizontal deflection coil 83. A further cathode follower 88 provides a staircase sweep voltage for a visual monitor, if employed.

The vertical sweep generator 25 of FIG. 1 is shown in detail in FIG. 3B and is essentially the same as the horizontal sweep generator 26 described above. Since the vertical deflection coil 83a of the vidicon is of higher impedance, linearity and drive are obtained with less power. Negative feedback is not required, and only one sweep drive tube 90 is needed.

The camera 10 shown in FIG. 1 is a conventional closed circuit TV camera utilizing a vidicon, with the exception that the sweep circuits normally employed in such a camera are replaced by the horizontal and vertical deflection circuits already described. Various portions of the overall camera circuit are illustrated in FIGS. 3B and 3E, and are appropriately labeled.

The vidicon gating circuit 17 is shown in detail in FIG 3B. The input clock waveform appearing on line 49 is differentiated by capacitor 91 and resistor 92. Since resistor 92 causes input transistor 93 to be normally saturated, the negative portion of this differentiated wave produces a negative pulse at the emitter of transistor 93 which is coupled to he base of transistor 94. Transistor 94 is also normally saturated through the connection of its base resistor 95 to a source of positive potential. The incoming negative pulse cuts off transistor 95 so that a positive pulse appears at its collector; and this positive pulse is directly coupled to the base of an emitter follower transistor 96. Emitter resistor 97 comprises a potentiometer which permits the amplitude of the gate signal to be controlled. The purpose of the vidicon gating circuit has already been described in reference to FIG. 1.

Figure 3F:
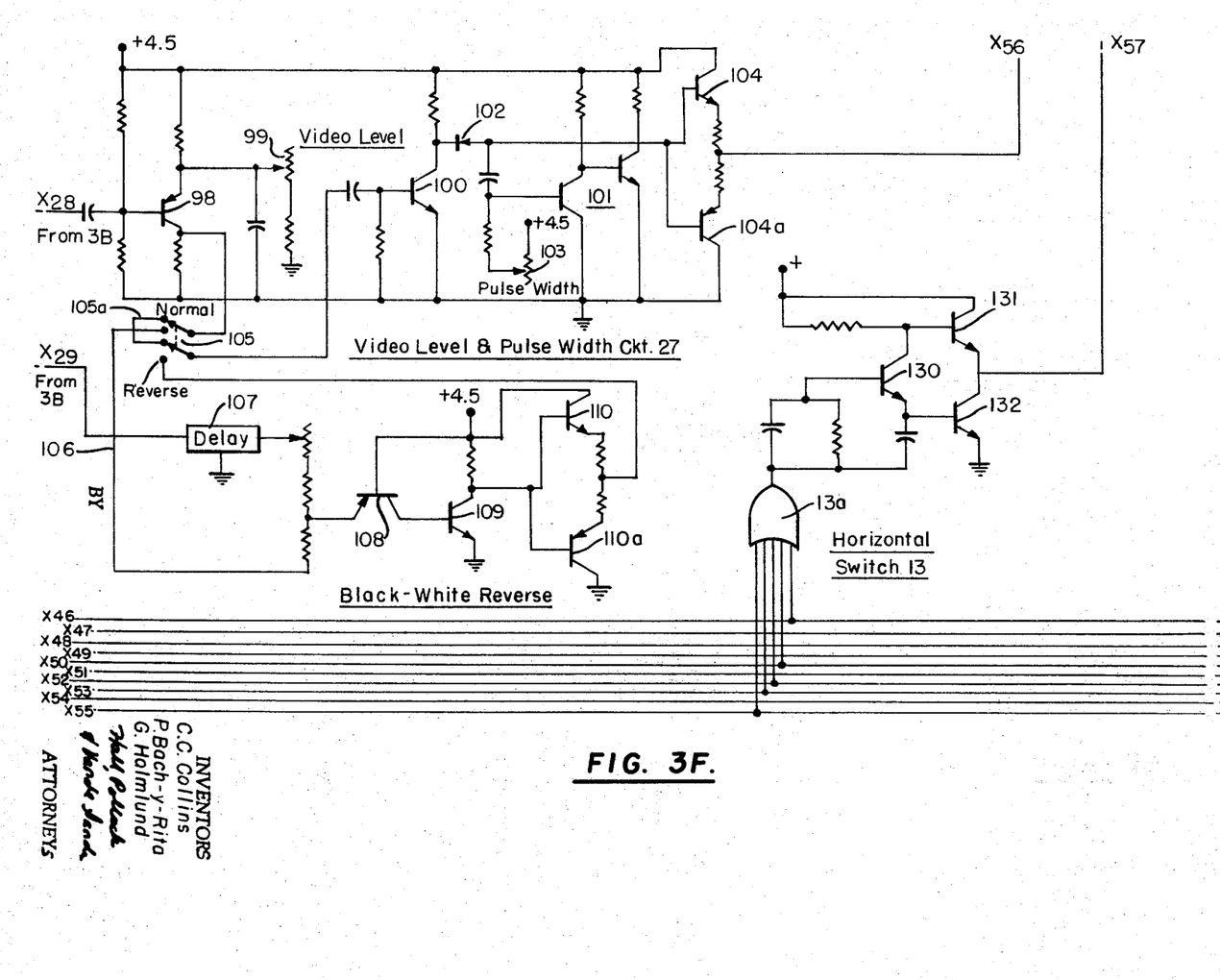

The video level and pulse width circuit 27 of FIG. 1 is shown in detail in FIG. 3F. Raw video from camera 10 is fed to the base of an input transistor 98. The bias of this transistor is set by a video level potentiometer 99 so that a white level of video well above the noise is required to exceed bias, and is then passed on to the pulse width circuit through a transistor amplifier stage 100. The output at the collector of transistor 100 is coupled to monostable multivibrator 101 through a diode 102 which isolates the multivibrator form the trigger source. The duration of multivibrator 101 can be varied from one to forty microseconds by a pulse width control 103. The output of multivibrator 101 consists of pulses of equal amplitude and duration, and is generated only by video that exceeds the threshold level preset by potentiometer 99. This binary video signal is applied to complementary symmetry emitter followers 104, 104a in order that the output signal will not be affected by the line capacity.

In a preferred embodiment, the overall system preferably includes a black-white reverse circuit of the type shown in FIG. 3F (not specifically shown in the block representation of FIG. 1). Use of the circuit is controlled by a reversing switch 105. In the "normal" position of switch 105, the black-white reverse circuit is ineffective, and signals pass from transistor 98 through shorting connection 105a to transistor 100 in the video level and pulse width circuit already described. However when switch 105 is moved to its "reverse" position the black-white reverse circuit is inserted between the video level-pulse width circuit and the video amplifier. With the lack of video from the video level and pulse width circuit 27, vidicon gating pulses are fed from line 106 (see FIGS. 3B and 3F) through a three microsecond delay line 107 and current limiting resistors to a common base gating transistor 108. The output of gating transistor 108 is fed through an amplifier inverter 109 and through complementary transistors 110, 110a to the pulse width circuit and thence to the video amplifier, giving an ON or "white" output. When video is present at the output of the video level-pulse width circuit 27, the overall arrangement operates to produce an OFF or "black" signal at the system output.

The system is adapted to achieve a tactile image taking the form of either a soled display, or comprising only the outline of such a display. When it is desired to achieve only the outline of a solid display, the "edge only" circuit shown in FIG. 3C is employed. This circuit acts as a digital filter and performs the equivalent of a single time derivative on the binary video signal. The circuit passed the first pulse of a series, but requires a dead time of at least one clock interval before it will pass another video pulse. Video pulses are fed into this circuit through a series gating transistor 112. Such pulses trigger a one shot multivibrator comprising transistors 113 and 114, associated with a capacitor recharging transistor 115. The trailing edge of a video pulse triggers both multivibrator transistor 113 and capacitor recharging transistor 115 which reset the one shot multivibrator. If a video pulse appears at the next clock interval, the output of the one show multivibrator will hold off the series gating transistor 112, and the one shot multivibrator is reset again by its timing capacitor 116 being recharged. This continues until a video pulse is missed at one clock interval so that the one shot multivibrator can complete its cycle. The next video pulse that is received will again be permitted to pass through the series gating transistor 112. Transistor 117 is an isolation amplifier located between the one shot multivibrator and the base of the video gating transistor 112, and permits the gating transistor 112 to be properly controlled by the multivibrator.

Since the televised image is swept from essentially all directions, as has already been described in reference to FIG. 2, the effect of the digital differentiator comprising the edge-only circuit is to produce a second spatial derivative of the image. This is represented as an outline drawing of the image on the monitor oscilloscope and on the tactile stimulator matrix.

FIG. 3C shows a detailed circuit for video amplifier 28. This amplifier operates to amplify video pulses to approximately 100 volts so as to properly operate the vertical switches (e.g., vertical switch 12). The video amplifier 28 also supplies a negative pulse to operate a visual monitor scope. As illustrated in FIG. 3C, complementary symmetry circuits are used to provide a low impedance to both the "on" and "off" portion of the pulse. Capacitor 120 is a speed-up capacitor to help the leading edge of the monitor pulse, and capacitor 121 cleans up the trailing edge. Output resistor 122 prevents oscillations from occurring in the monitor scope.

As discussed in reference to FIG. 1, a plurality of vertical and horizontal switches 12 and 13 are used to drive the cross bar matrix in array 11. When the array comprises 400 elements, 20 vertical switches are provided to drive another edge of the matrix. Each vertical switch includes a NOR gate such as has been designated 12a in FIG. 3C. Similarly each horizontal switch includes a NOR gate of the type designated 13a in FIG. 3F; and each of these vertical ans horizontal gates cooperate with a related vertical bus and horizontal gates cooperate with a related vertical bus and horizontal bus, e.g., buses 12b and 13b in FIG. 3C, to selectively activate a particular solenoid switch, e.g., 11a (see FIGS. 1 and 3C). The 20 vertical bus switches supply +100 volts to their respective vertical buses in the cross bar matrix at the time selected by a gate such as 12a only if there is video information present at that moment. The vertical bus switches operate in conjunction with the horizontal bus switches to cause a capacitor 125, comprising a portion of the selected solenoid switch, to charge. The horizontal switch completes the video circuit to ground at the appropriate time and location in the sweep pattern.

Each vertical switch gate, such as 12a, is associated with an input gate transistor such as 126 which is normally conducting, holding its collector at near zero volts even if 100 volt pulses are being supplied by the video amplifier at the other end of resistor 127. When gate 12a is turned off by the appropriate combination of logic bus voltages, it similarly turns off its associated input transistor 126 permitting the collector voltage to rise when video pulses arrive at resistor 127 from the video amplifier. If video pulses arrive when the input transistor gate 126 is off, an amplifier 128 is turned on and a positive voltage pulse is applied to the respective vertical bus of the solenoid matrix, e.g., vertical bus 12b. Capacitor 129 is a speed-up capacitor permitting the input gate transistor 126 to turn on and off rapidly.

The 20 horizontal bus switches complete the video circuit to ground through the respective horizontal buses, as selected by a NOR gate such as 13a (see FIG. 3F). Each gate 13a is associated with an input transistor such as 130 which is normally nonconducting so that its collector voltage is at plus 100 volts and its emitter voltage is at 0 volts. This state of operation causes transistor 131 to turn on and supply +100 volts to the horizontal bus, such as 13b, with transistor 132 remaining off. When the appropriate logic turns on gate 13a, input transistor 130 is turned on causing a positive voltage to appear at its emitter, and its collector voltage drops to a low value. The output of transistor 130 turns off transistor 131 and turns on transistor 132 at the same time, which brings the horizontal bus 13b of the matrix down to near zero volts. Transistor 132 is required to discharge the capacity on the matrix bus when transistor 131 is turned off. Speed-up capacitors are employed to reduce transistor turn on time, their values being matched to the respective transistors.

A solenoid switch is provided for each vibrotactor in the matrix array 11. These switches, when energized by the respective vertical and horizontal bus, will turn their associated vibrotactor on for approximately 100 milliseconds. If there is light at that point in the scan pattern on each succeeding scan, the switch is held on continuously for the scanning interval. The time that the switch will remain on is controlled by the input RC time constant. The arrangement is shown in FIG. 3C and includes an input transistor 135 which supplies base current for the solenoid coil itself is designated 137; and switch transistor 136. The vibrotactor solenoid coil itself is designated 137; and when its associated switch is on, half wave 60-wave energization is applied across the solenoid from a source 138 causing the solenoid to vibrate at a 60-rate. Decoupling diodes 139, 140 and 145 are provided to prevent cross talk in the matrix.

The base resistor 141 of transistor 135 reduces the effect of $I_{CBO}$ of the input transistor, and the emitter resistor 142 reduces the effect of $I_{CBO}$ of the switch transistor 136, preventing leakage currents from turning the transistors on. Input transistor 135 is provided with a separate power source 143 since the half wave 60-cycle used tends to turn on the switch due to charging current. The base capacitor 144 prevents pulses occurring only on the vertical bus 12b from turning on the switch. The half wave 60-cycle supply is variable in amplitude in order that the intensity of the tactile stimulus may be varied.

While we have thus described a preferred embodiment of the present invention, many variations will be suggested to those skilled in the art. The foregoing description is accordingly intended to be illustrative only, and not limitative of our invention, and all such variations and modifications as are in accord with the principles described are meant to fall within the scope of the appended claims.

Having thus described our invention, we claim:

1. A visual substitution system comprising an artificial receptor for converting visual information into electrical signals, said artificial receptor comprising an array of photosensitive elements, a simulator matrix for engagement with the skin of a subject, said matrix comprising an array of spaced stimulator elements disposed in a configuration corresponding to the configuration of said array of photosensitive elements, coupling means including a single video amplifier for coupling electrical signals from said artificial receptor to said stimulator matrix and means for scanning the photosensitive elements in said artificial receptor and the stimulator elements in said stimulator matrix in a like diagonal quadrature sweep pattern, said scanning means including switching means for individually connecting in sequence the photosensitive element in said artificial receptor array, via said video amplifier, to corresponding ones respectively of the stimulator elements in said stimulator matrix.

2. The system of claim 1 wherein said coupling means includes threshold means for coupling signals having an amplitude in excess of a selected magnitude to said matrix and for preventing such coupling of signals having an amplitude less than said selected magnitude.

3. The system of claim 1 wherein said coupling means includes outline circuit means for preventing the coupling of selected ones of said electrical signals to said matrix, to produce an outline representation only of said visual information at said stimulator matrix.

4. The system of claim 3 including switch means for selectively rendering said outline circuit means inoperative.

5. The system of claim 1 wherein said artificial receptor comprises a television camera.

6. The system of claim 1 wherein said coupling means includes switchable phase inverter means for selectively reversing said tactile representation between black-on-white and white-on-black states.

7. The system of claim 1 wherein said stimulator matrix comprises an array of vibrators.

8. The system of claim 1 including digital sweep generator means operative to control said scanning means to effect said scanning in a discontinuous step-by-step se sequence.

9. The system of claim 8 including periodically operable means for sampling the visual information at each of said photosensitive elements after each step of said scanning sequence has terminated and before the next step commences, said sampled information being coupled via said video amplifier to said stimulator matrix.

10. The system of claim 8 wherein said digital sweep generator means includes reversible digital counter means, and clock means for driving said counter means.

UNITED STATES PATENT OFFICE
CERTIFICATE OF CORRECTION

Patent No. 3,594,823                    Dated July 27, 1971

Inventor(s)  CARTER C. COLLINS, et al.

It is certified that error appears in the above-identified patent and that said Letters Patent are hereby corrected as shown below:

Assignee:  THE INSTITUTE OF MEDICAL SCIENCES
           San Francisco, California Signed and sealed this 9th day of May 1972.

(SEAL)
Attest:

EDWARD M. FLETCHER, JR.          ROBERT GOTTSCHALK
Attesting Officer                Commissioner of Patents